United States Patent [19]

Hyatt, Jr. et al.

[11] Patent Number: 5,745,044
[45] Date of Patent: Apr. 28, 1998

[54] ELECTRONIC SECURITY SYSTEM

[75] Inventors: Richard G. Hyatt, Jr., Shawsville; Douglas Trent, Roanoke; Charles Hall, Salem, all of Va.

[73] Assignee: Medeco Security Locks, Inc., Salem, Va.

[21] Appl. No.: 865,849

[22] Filed: Apr. 9, 1992

Related U.S. Application Data

[63] Continuation-in-part of Ser. No. 522,017, May 11, 1990, Pat. No. 5,140,317.

[51] Int. Cl.⁶ .................................................. H04Q 1/00
[52] U.S. Cl. .............................. 340/825.31; 340/825.34; 380/45
[58] Field of Search ................. 340/825.31, 825.34; 70/278; 380/43, 44, 45

[56] References Cited

U.S. PATENT DOCUMENTS

| | | | |
|---|---|---|---|
| 3,337,992 | 8/1967 | Tolson | 340/533 |
| 3,500,326 | 3/1970 | Benford . | |
| 3,660,624 | 5/1972 | Bell | 200/44 |
| 3,926,021 | 12/1975 | Genest et al. | 70/278 |
| 4,031,434 | 6/1977 | Perron et al. | 361/172 |
| 4,438,426 | 3/1984 | Adkins | 340/64 |
| 4,594,637 | 6/1986 | Falk | 361/172 |
| 4,646,080 | 2/1987 | Genest et al. | 340/825.31 |
| 4,686,358 | 8/1987 | Seckinger et al. | 235/382 |
| 4,697,171 | 9/1987 | Suh | 340/543 |
| 4,738,334 | 4/1988 | Weishaupt | 180/287 |
| 4,742,426 | 5/1988 | Lavelle | 361/171 |
| 4,789,859 | 12/1988 | Clarkson et al. | 340/825 |
| 4,810,861 | 3/1989 | Herriott et al. | 235/382 |
| 4,819,267 | 4/1989 | Cargile | 380/44 |
| 4,829,296 | 5/1989 | Clark et al. | 340/825.31 |
| 4,835,407 | 5/1989 | Kataoka et al. | 307/10.5 |
| 4,864,292 | 9/1989 | Nieuwkoop | 340/825.31 |
| 4,868,409 | 9/1989 | Tanaka et al. | 307/10.5 |
| 4,870,400 | 9/1989 | Downs et al. | 340/825.31 |
| 4,887,292 | 12/1989 | Barrett | 340/825.31 |
| 4,962,449 | 10/1990 | Schlesinger | 364/200 |
| 5,144,667 | 9/1992 | Pogue | 340/825.31 |

FOREIGN PATENT DOCUMENTS

| | | |
|---|---|---|
| 243586 | 11/1987 | European Pat. Off. . |
| 2158870 | 11/1985 | United Kingdom . |
| 8902507 | 3/1989 | WIPO . |

Primary Examiner—Brian Zimmerman
Attorney, Agent, or Firm—Rothwell, Figg Ernst & Kurz

[57] ABSTRACT

An electronic security system includes an electronic lock mechanism and an electronic key, each of which is provided with a microprocessor controller and a memory storing data including an ID code and encryption key codes. The lock microprocessor may either change ID codes stored in its memory or encrypt a seed number to be used for determining access to the lock. The key can only be used to access the lock either once or for a limited number of successive times, and must thereafter be reprogrammed by a host computer to be loaded with either the proper ID code or the appropriate encryption key code for that lock. The electronic lock operates a solenoid which retracts a bolt-blocking mechanism that prevents the unlocking of the bolt even when a key having the correct mechanical key cuts is inserted into the lock. Power for operating the electronic lock as well as the solenoid is provided by a power supply within the key. In a preferred embodiment the key unit is composed of a hand-held computer and key module interface.

15 Claims, 11 Drawing Sheets

ELECTRONIC SECURITY SYSTEM

This application is a continuation-in-part of application Ser. No. 522,017 filed May 11, 1990, now U.S. Pat. No. 5,140,317.

BACKGROUND OF THE INVENTION

1. Field of the Invention

This invention relates generally to electronic security systems, and more particularly to electronic security systems for money-containing devices such as pay telephones, vending machines, bill changers or the like, which must be periodically accessed by a collector in order to retrieve the funds accumulated in the device.

2. Background and Prior Art

Typically, the collection of money from coin or currency operated devices such as pay telephones, transit system fare card machines or the like is a costly and burdensome operation. For instance, a company may own tens or even hundreds of thousands of pay telephones for which tens or hundreds of thousands of keys must be kept in order to prevent the loss of a key from requiring the changing of locks on thousands of devices which would operate with the lost key.

Another problem involved with the collection of funds from currency operated devices is the possibility of fraud or theft by a collector. Typically, a collector should remove a locked coin box from the device and replace it with an empty lock box to which he does not have access. However, it is possible that a removed coin box will not be replaced with another lock box but rather will be replaced with an unlocked receptacle which can be later removed by that collector before turning in his key at the end of the collection shift.

Yet another cost involved in the collection process is the sheer manpower required for the task of distributing, collecting, and keeping track of many thousands of keys on a daily basis.

Although electronic security systems are known and have been used for various purposes, see e.g. U.S. Pat. Nos. 4,789,859, 4,738,334, 4,697,171, 4,438,426, applicants are unaware of any which specifically address the problems, noted above.

SUMMARY OF THE INVENTION

The present invention provides an electronic security system which overcomes the problems mentioned above and significantly reduces collection costs.

The present invention also provides an electronic security system which eliminates the requirement of costly rekeying in the event of a key loss.

The present invention further provides an electronic security system which substantially eliminates the possibility of internal fraud and theft.

This invention is an electronic security system comprising a lock including a bolt movable between a locked and an unlocked position, a key actuated lock cylinder having a bolt cam in contact with said bolt to prevent the bolt from moving when in a locked position, and operable upon actuation to move the bolt to the unlocked position, a retractable locking means for preventing the bolt from moving to the unlocked position when unretracted and allowing the bolt to be moved to the unlocked position when retracted, an electrically powered solenoid operable to retract the blocking means upon switching of power thereto, a microprocessor for controlling the switching of power to the solenoid, and a memory coupled to the microprocessor storing coded data.

The invention further includes key means insertable into the lock cylinder for supplying power to the solenoid to retract the blocking means and for actuating the lock cylinder to move the bolt to the unlocked position, including a power supply for supplying power to the solenoid, a controller, a memory storing coded data, and means for establishing electrical connection between the controller and the microprocessor through contact terminals in the lock cylinder for transmission of the coded data, in which the microprocessor includes means for comparing the coded data read from the key means with coded data stored in the coupled memory, and means for enabling the power supply of the key means to power the solenoid when the means for comparing has determined that the coded data from the key means matches the coded data in the coupled memory of the lock.

In another embodiment, the invention includes the use of encryption key codes in the lock unit and in the key unit, each unit encrypting a seed number provided by the lock unit to determine whether the key has been authorized to access the lock. Upon successful access, the encryption key code in the key is overwritten with date stamp information to prevent further access.

BRIEF DESCRIPTION OF THE DRAWINGS

The present invention will become more fully understood from the detailed description given hereinbelow and the accompanying drawings which are given by way of illustration only, and are not limitative of the present invention, and wherein.

DETAILED DESCRIPTION OF THE PREFERRED EMBODIMENTS

Figure 1A:
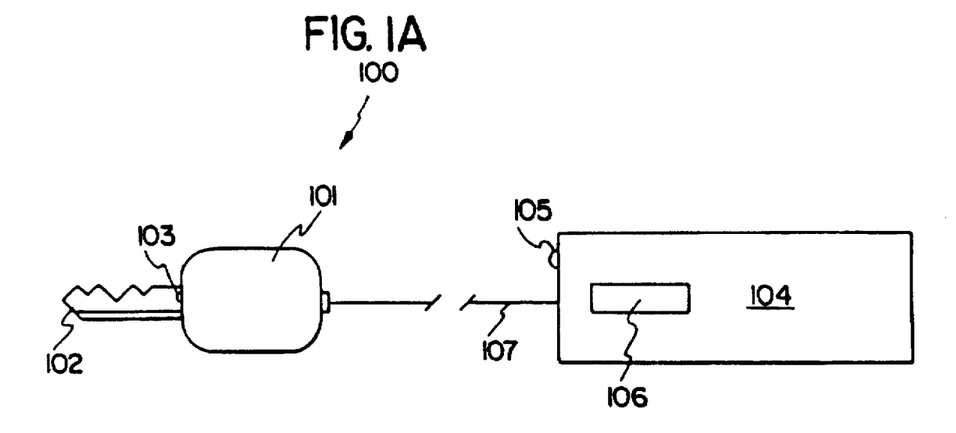
FIGS. 1A and 1B are side and end elevational views, respectively, of an electronic key with its own power supply according to one preferred embodiment of the present invention.
Figure 1B:
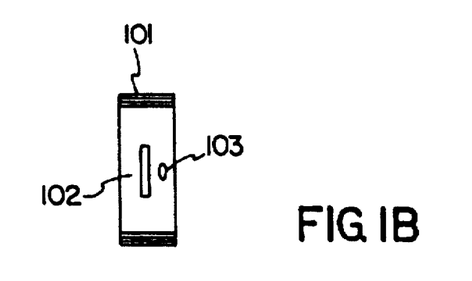

FIGS. 1A and 1B illustrate an electronic key 100 according to a first embodiment of the present invention. The key has a key body 101 which contains logic and power transfer circuitry, and a key blade 102 with appropriately cut key bits for operating pin tumblers as is known in the art. The key 100 also carries a spring loaded data and power electrical contact 103, which is made of a suitable material and is preferably gold plated.

Portable battery and logic housing 104 contains a battery power supply and electronic circuitry, a battery charging port 105, a wrist strap or belt clip 106, and a plug-connected cable 107 for transferring power and data signals between the housing 104 and the key body 101.

FIG. 1B is an end view of the key body showing the orientation of the spring loaded contact 103 with relation to the key blade 102. The key 100 and connected housing 104 with their components are portable and are referred to as "key means".

Figure 2:
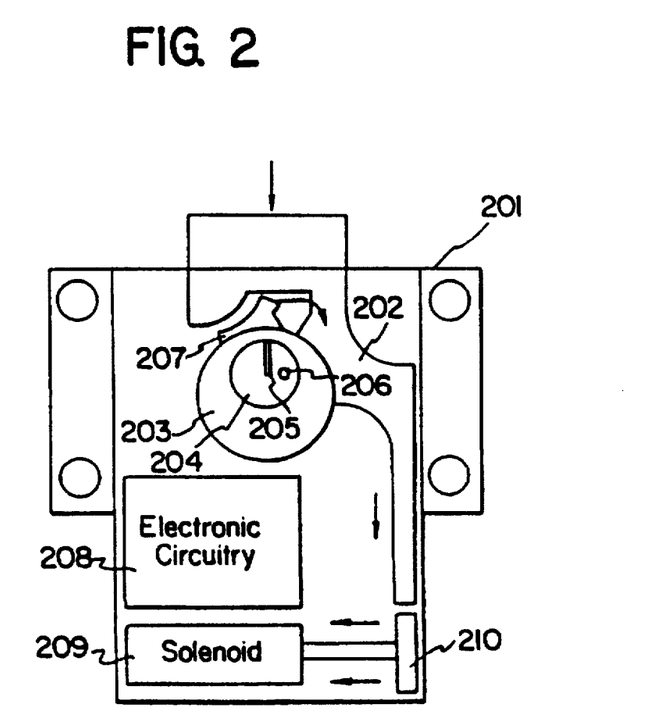
FIG. 2 is a front elevation view of a lock cylinder and associated mechanisms (shown with the housing cover removed) for operation with the key of FIGS. 1A and 1B.

FIG. 2 illustrates a lock cylinder and bolt mechanism according to one embodiment of the present invention, included in a housing 201 (with its cover removed). Within the housing is a bolt 202 operated by a lock cylinder 203 containing a key cylinder plug 204 having a keyway 205 for key blade 102, and an electrical contact 206 which makes contact with the power and data contact 103 of the key body when the key blade 102 is inserted into the key blade opening 205.

A bolt cam 207 is rotated by the lock cylinder 203 to move the bolt 202 between the locked position shown and an unlocked position in which the bolt is withdrawn downward to be substantially within the housing 201. The lock housing 201 further includes electronic logic circuitry 208 and an electrically powered solenoid 209. Solenoid 209 includes a spring biased bolt blocking plunger 210 which, when extended, prevents bolt 202 from being withdrawn by the bolt cam into the housing 201 to its unlocked position. Upon operation of the solenoid 209, bolt blocking plunger 210 is retracted toward the solenoid to enable the key 100 to be turned in the clockwise direction which rotates bolt cam 207 against the bolt 202 and causes the movement of the bolt 202 downward into the housing 201.

Figures 3, 4:
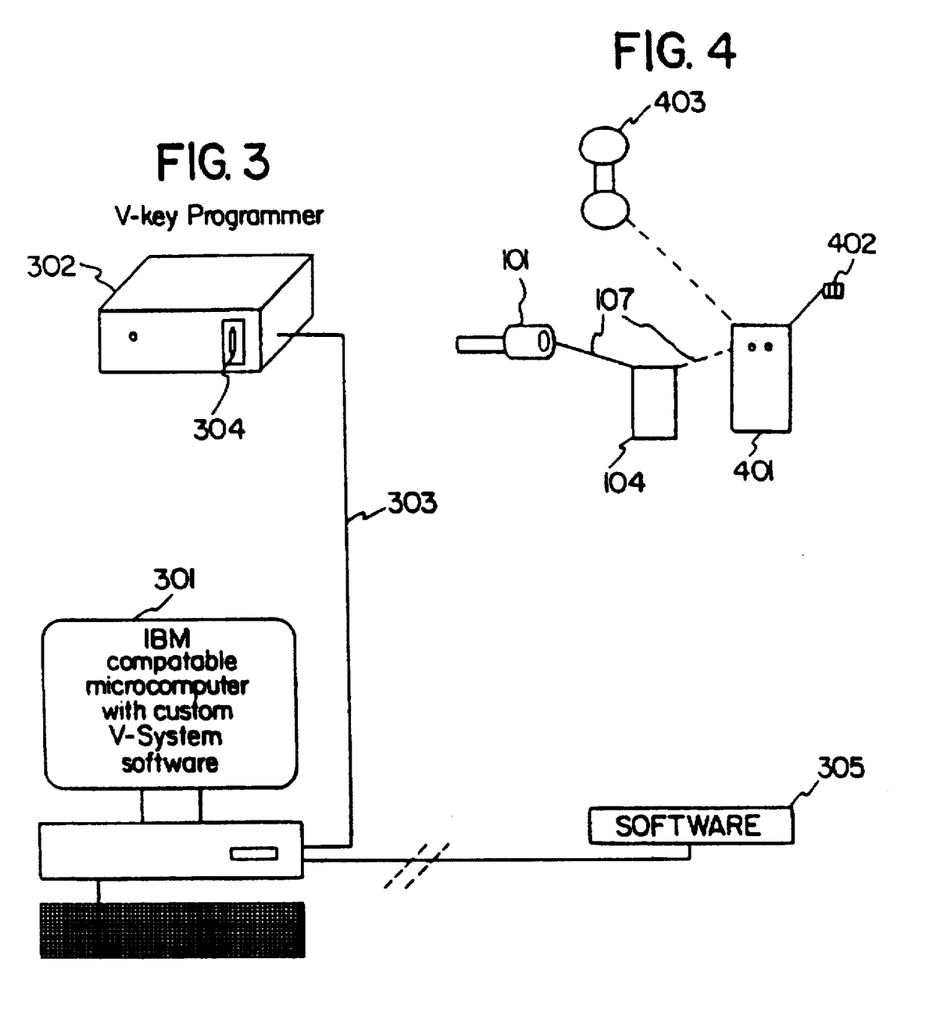
FIG. 3 is a schematic view of a first embodiment of an electronic key programmer according to the present invention.
FIG. 4 is a schematic view of another embodiment of a portable key programmer according to the present invention.

FIG. 3 illustrates a programmer for writing data into and reading data from the circuitry in key body 104 through cable 107. The programmer includes a host computer 301 which may be a minicomputer, personal computer, or any other type of computer, but which preferably is an IBM® compatible microcomputer. A key programmer interface unit 302 is connected to the computer 301 by means of a cable 303 which plugs into a communication port of the computer 301. The programmer interface unit 302 contains a key receptacle 304 having electrical contacts into which the plug end of the key cable 107 is inserted after being disconnected from key body 101 to allow the computer to write into the memory within key housing 104. The computer 301 is loaded with a software program 305 for loading and retrieving files from the key logic housing 104.

FIG. 4 illustrates a portable programmer interface unit 401 including a modem which enables the portable programmer interface unit 401 to communicate with the computer 301 through the public switched telephone network (PSTN) via a standard phone jack 402. In this embodiment, an operator in the field needing to update the contents of files in the key housing 104 would dial up the host computer using a standard phone set 403 which is connectable via a jack to the programmer interface 401. Once communication with the host computer 301 is established, the programmer interface unit 401 operates in the same manner as the office programmer interface unit 302.

Figure 5:
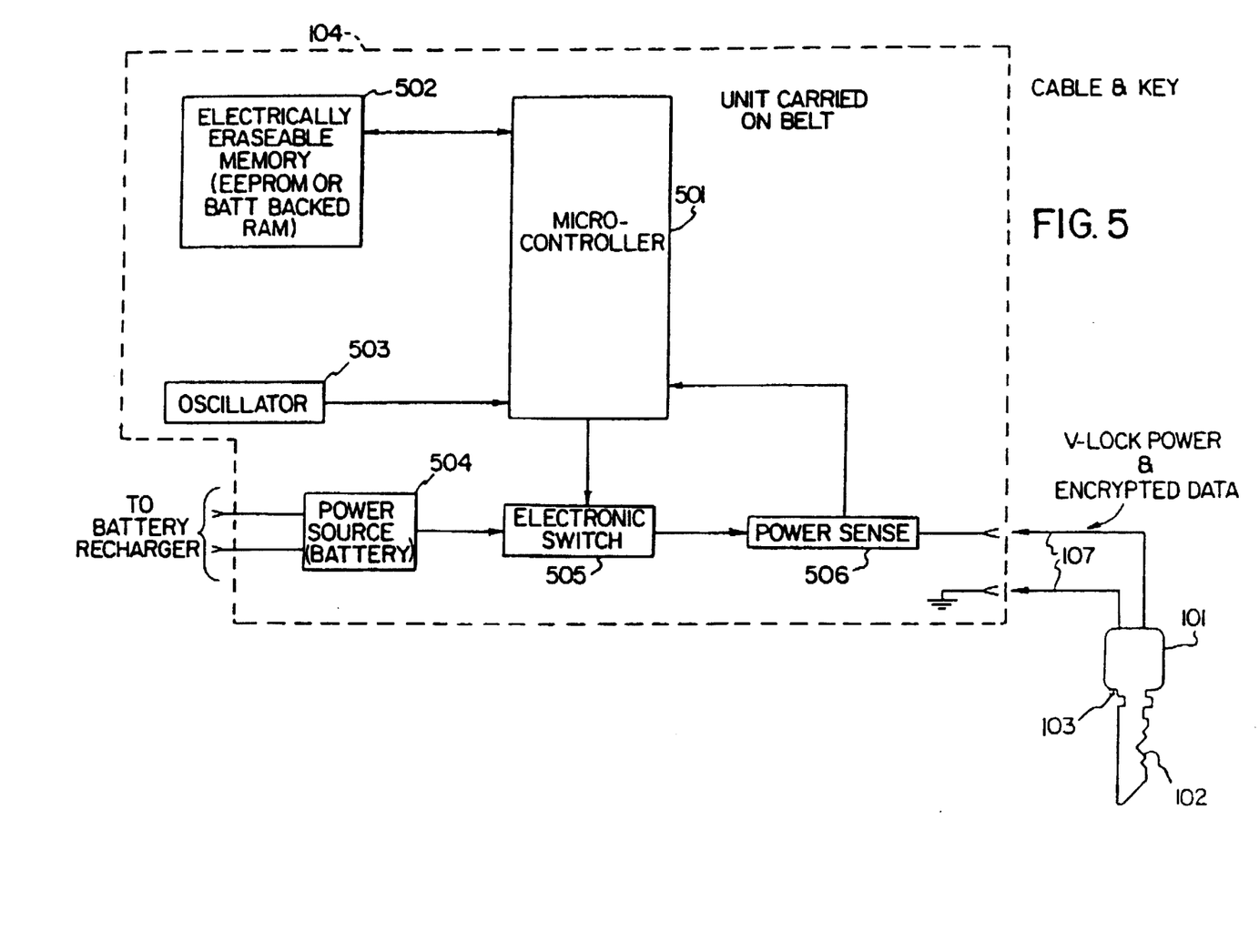
FIG. 5 is a schematic block diagram of the circuit elements of the electronic key of FIG. 1A.

FIG. 5 is a schematic block diagram illustrating the components within the electronic key housing 104. The components include a microcontroller or microprocessor 501, an electrically erasable programmable read only memory (EEPROM) 502 coupled to the controller 501, an oscillator or clock 503 which provides clock signals for the operation of controller 501, and a battery power source 504 which operates the controller 501 as well as the solenoid 209 and the circuitry 208 within the lock mechanism housing 201. The electronic key components further include an electronic switch 505 operated by the controller 501 and a power sensing circuit 506.

Figure 6:
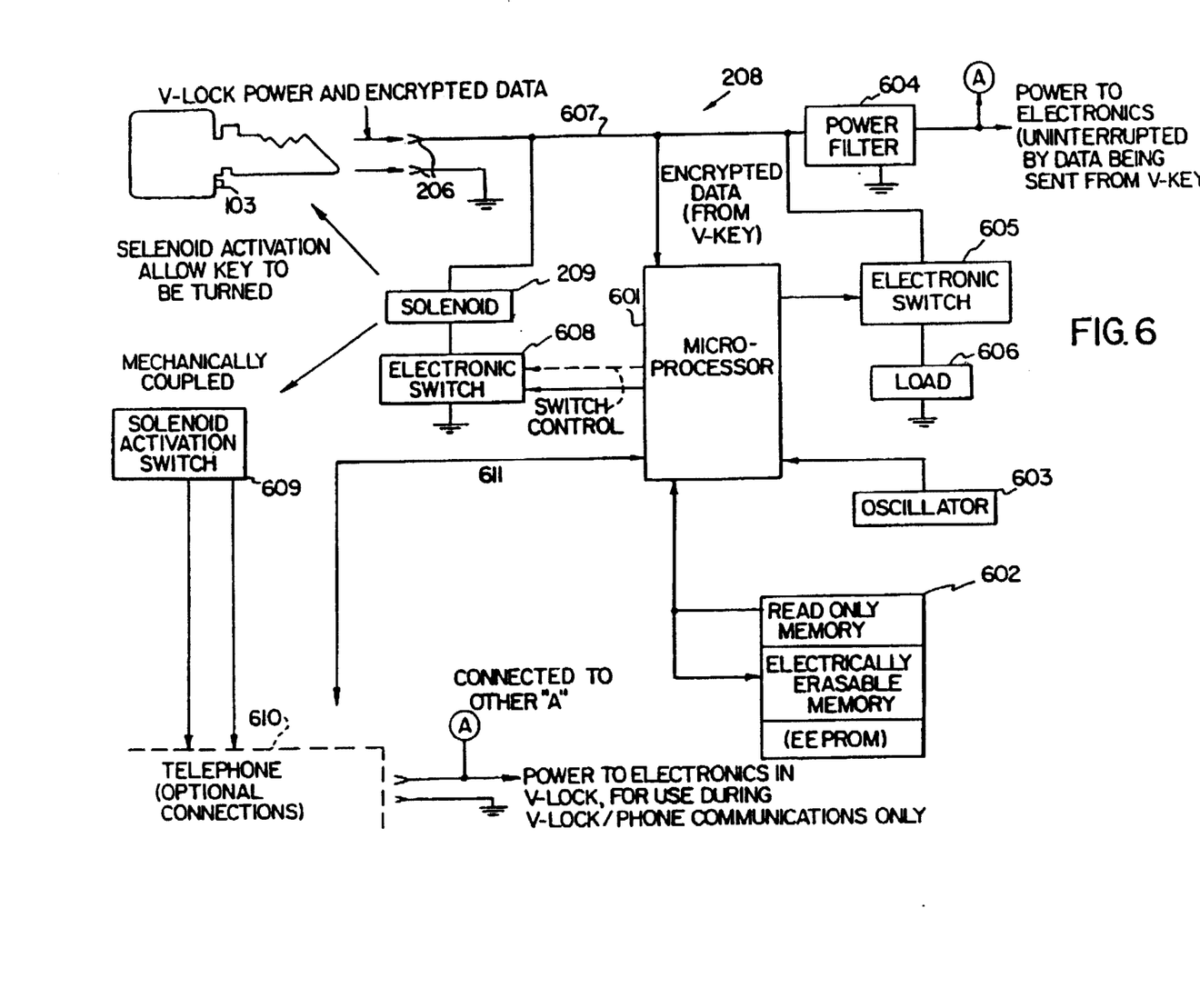
FIG. 6 is a schematic block diagram of the electronic components of the lock mechanism of FIG. 2.

FIG. 6 is a schematic block diagram of the electronic circuitry 208 within the lock housing 201. This circuitry includes a microprocessor 601, an EEPROM 602 coupled to the microprocessor 601, an oscillator or clock 603 for providing operational clock signals to the microprocessor 601, a power filter 604, electronic switch 605 and load 606 for transmission of signals to the key controller 501 via line 607, and an electronic switch 608 for allowing power to flow from power source 504 within the key housing 104 through cable 107 and contacts 103–206 through the solenoid 209 to ground to activate the solenoid.

Figure 7:
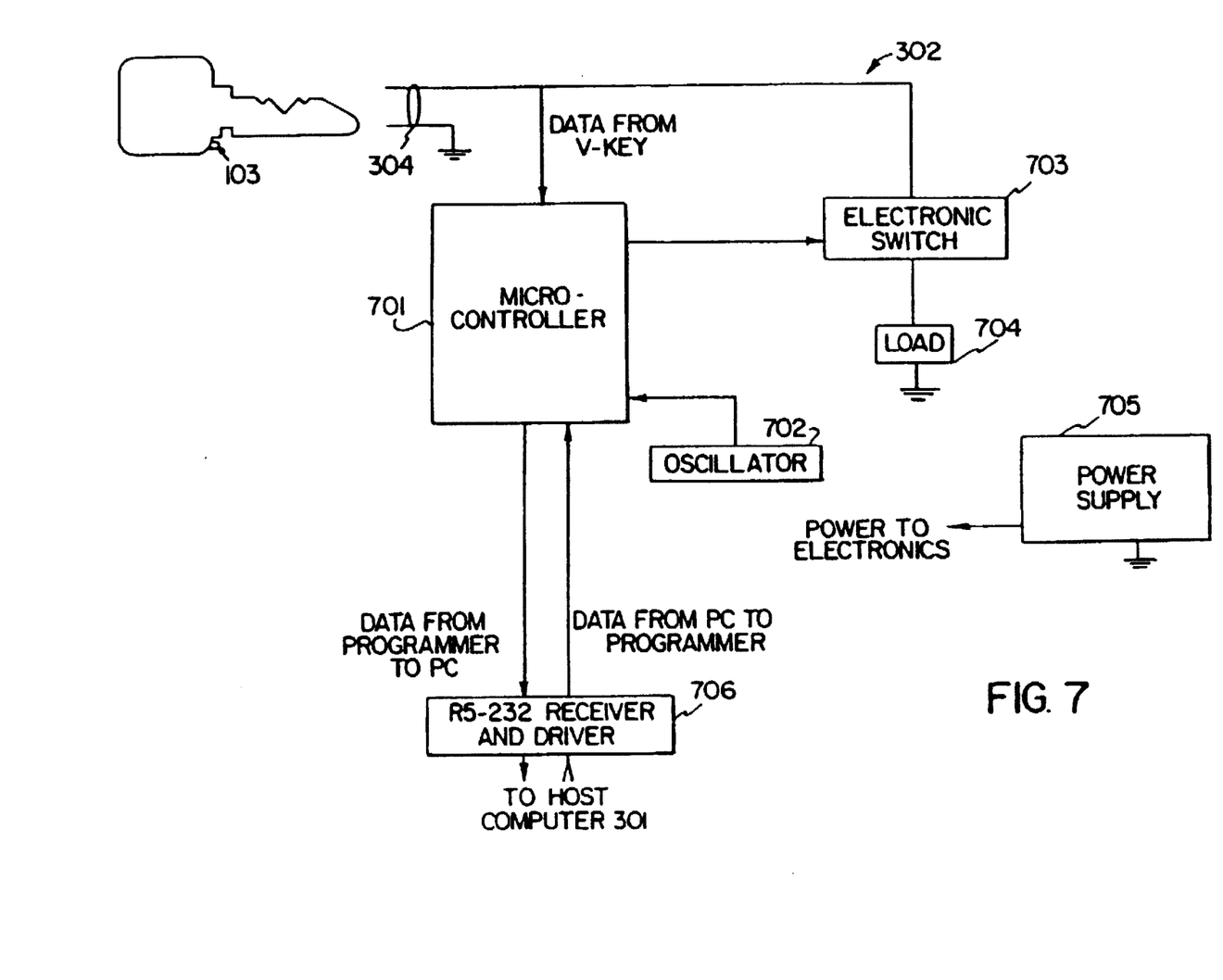
FIG. 7 is a schematic block diagram of the electronic key programmer of FIGS. 3 and 4.

FIG. 7 is a schematic diagram of the electronic key programmer interface unit 302. It is noted that the portable key programmer interface unit 401 contains substantially the same components as the programmer 302, in addition to the modem and telephone jack not shown. The programmer interface unit 302 includes a microcontroller 701, a clock oscillator 702, an electronic switch 703 and load 704 combination which operate similarly to the switch 605 and load 606, a power supply 705, and a standard RS-232 receiver and driver 706 which couples the programmer interface unit 302 to the host computer 301.

The operation of the system components will now be described with reference to FIGS. 5–7.

The electronic key 100 is inserted into the key programmer interface unit 302 or 401 to be programmed by the host computer running the customized software application 305 via cable 107 as described above.

Using the example of a lock for pay telephones for illustration, the EEPROM 502 is loaded with data corresponding to a specific collection route. The data can be entered manually through a keyboard provided with the host computer 301, or the data can be transferred to the EEPROM 502 from files on a floppy disk inserted into a standard floppy disk drive of the computer 301.

EEPROM 502 is loaded with specially encrypted data corresponding to specific ID codes stored in each of the electronic lock memories 602 of the locks on the specific collection route. Data encryption is performed by an encryption algorithm in a known manner. EEPROM 502 also is loaded with the date of key programming, the start date as of which the key is valid, and a time window during which the key can be used, for example, 24, 48 or 72 hours from the start date. EEPROM 502 also contains an address location storing the particular key category, for example, whether the key is a collection key or service key, and a serial number for key identification. The data is encrypted using a specific algorithm performed by the software 305.

The computer 301 may also print out the particular collection route, lock key codes, time window, and start date for confirmation by the programmer.

Controller 501 keeps track of the current time and date by counting the clock inputs of oscillator 503 and using the key programming date as a reference.

The data is written into EEPROM 502 through switching of electronic switch 703 by microcontroller 701 which serves to increase and decrease the amount of power consumed by the load 703 which in turn provides the logic levels for binary "1" and "0" digital communication to the microcontroller 501. This increase and decrease in power is sensed by the power sense circuit 506 and is converted into digital signals readable by the microcontroller 501.

Referring now to FIG. 6, the lock mechanism microprocessor 601 is coupled to EEPROM memory 602 which stores a specific ID code for that specific lock. One important feature of the present invention is that the lock mechanism of FIG. 2 contains no power supply itself but is completely powered by the power source 504 of the electronic key 100. Power filter 604 is provided to supply power to the logic circuits from the key 100 over line 607, the power filter smoothing the voltage waveform so that power interruptions caused by data transmission over line 607 will not affect the operation of the logic circuits.

As an additional security feature, a solenoid activation switch 609 can be mechanically coupled to the bolt blocking plunger 210 of FIG. 2 to detect the retraction of the bolt blocking plunger. In telephones equipped with a so-called "Smart Terminal" or circuit board 610, which is provided with a modem to link the telephone to the host computer over a telephone line, activation switch 609 can be used to send an alarm to the host computer when switch 609 detects the retraction of the bolt blocking plunger in the absence of generation of an enable signal by the microprocessor 601, which would be indicative of someone tampering with the lock by trying to manually pry the bolt blocking plunger away from bolt 202. An additional line 611 may be provided to establish communication between the lock microprocessor and the smart terminal 610.

The use of a smart telephone terminal 610 also allows the use of a host confirmation feature as an additional feature of the present invention. Part of the data stored in the key memory 502 is the key's particular serial number. Using the host confirmation feature, the host computer 301 would dial up the smart terminal 610 via a modem and transmit a host confirmation message to the microprocessor 601. The message may instruct the microprocessor to allow the solenoid 209 to be powered by any mechanically operable key inserted into the key slot 205, may instruct the microprocessor 601 to prevent any key at all from operating the lock by prohibiting powering of the solenoid 209, or may instruct the microprocessor 601 to allow only a key having a particular serial number, transmitted by the host computer, to operate the lock by powering the solenoid. The host confirmation data may then be stored in the memory 602 coupled to the microprocessor 601.

Figure 8:
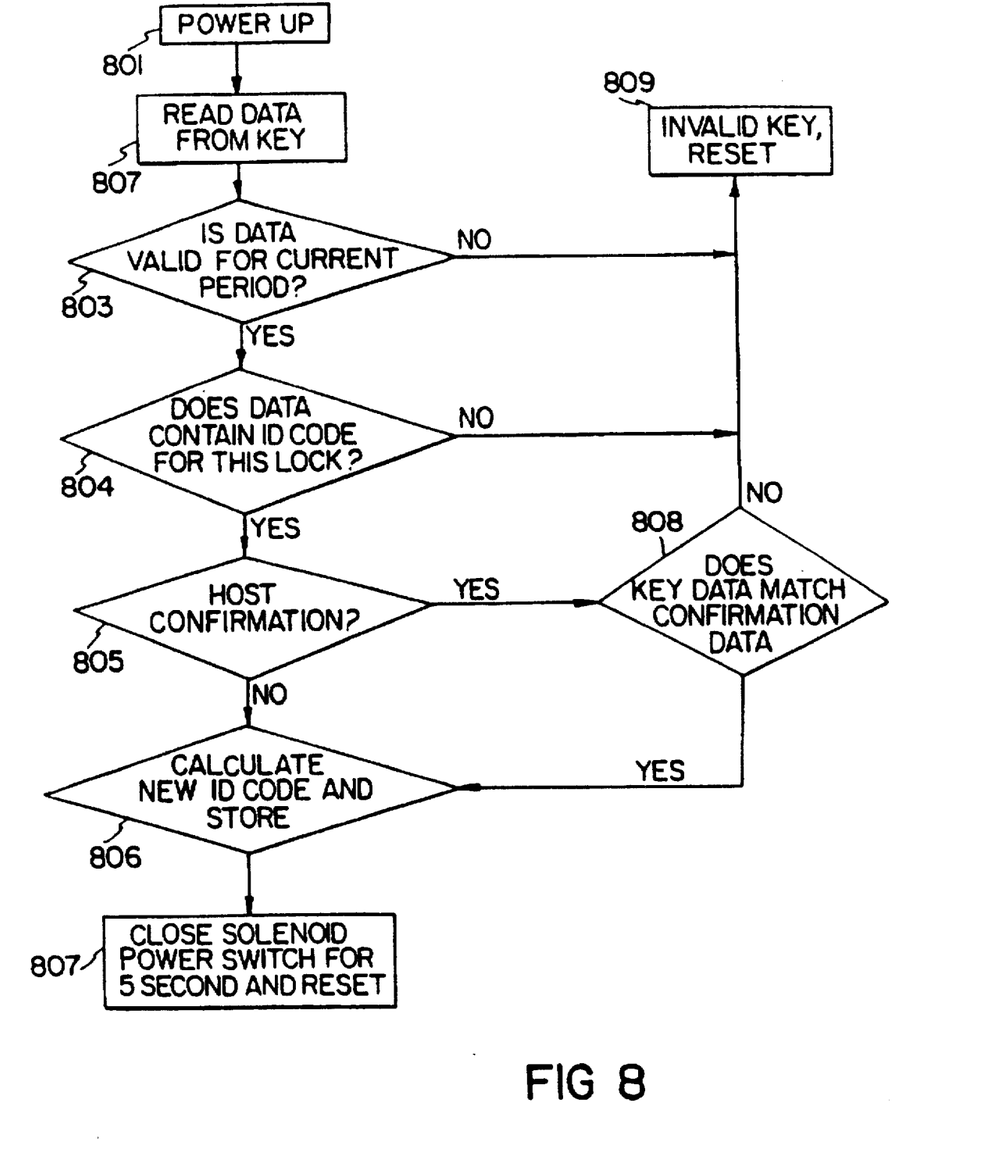
FIG. 8 is an operational flow chart diagram of the electronic lock mechanism operation.

Referring now to FIG. 8, the overall operation of the electronic lock system will be described.

After the key blade 102 is inserted into the keyway 205 and the contact 103 is electrically coupled to the key cylinder contact 206, the electronic lock logic circuitry is powered up or awakened at step 801. At step 802, microprocessor 601 communicates with the microcontroller 501 to read the data stored in the memory 502. At step 803, microprocessor 601 checks whether the current date stored in memory 502 is after the start date written into memory 502 during the programming mode of the key, determines whether the current time read from memory 502 is within the time window stored in memory 502 which has been programmed by the host computer in advance. If the start date read from the key memory is subsequent to the current date read from the key memory, or if the current time is outside of the time window stored in the key memory, the microprocessor advances to step 809 at which the key is determined to be invalid, the microprocessor 601 is reset, and no further action is taken. If the time and date data is valid, the microprocessor 601 proceeds to step 804 in which the list of ID codes stored in key memory 502, corresponding to the locks that key 100 is to operate on this particular collection route, is compared with the current ID code stored in the memory 602. If the ID code in memory 602 is contained in the list stored in memory 502, the process proceeds to step 805 in which the presence of a host confirmation feature is checked. If not, the microprocessor proceeds to step 809. If the telephone is not equipped with a smart terminal 610, processing proceeds to step 806 in which microprocessor 601 calculates a new ID code according to a prestored algorithm in memory 602, encrypts the new ID code and stores it in memory 602, replacing the previous ID code stored therein. At step 807, microprocessor 601 transmits a signal to electronic switch 608 which allows power to flow from power source 504 through solenoid 209, and causes bolt blocking plunger 210 to retract in the direction toward the solenoid 209 for a predetermined period of time such as 5 seconds. At this time, the operator may turn the key body 101 and unlock the bolt. The microprocessor 601 then resets before the key body 101 is withdrawn from the insert slot 205. After the bolt is relocked, the bolt blocking plunger 210 moves back to its blocking position shown in FIG. 2 by spring bias action.

If the coin telephone is one equipped with a smart terminal, processing proceeds from step 805 to step 808. In this step, microprocessor 601 determines whether the key serial number matches the serial number transmitted from the host computer, or whether the host computer has sent a message to prevent all keys from operating. If the key data matches the data stored in the memory 602, processing proceeds to step 806 as described above. If the key data does not match, or microprocessor 601 has received a prohibit message, processing proceeds to step 809.

As an additional feature, each lock may write its serial number and current time into a specific location of the memory 502 of the key in the event that all key data is valid to indicate that the specific lock was operated at the particular time stored with the serial number. Upon return of the key to the central office, the key may be re-inserted into the programmer interface unit 302 and the files in memory 502 read by the host computer in order to maintain a list of the locks that were operated as well as those that were not operated. All of the algorithms utilized by each of the lock microprocessors 601 are stored in the host computer 301 such that after the key is returned at the end of a collection cycle, the key may be reprogrammed with the new ID codes currently being stored in each of the operated locks, while the ID codes for the locks that have not been operated are left unchanged within the key memory 502.

Description will now be made of the second preferred embodiment of the present invention with reference to FIGS. 9–12.

Figure 9:
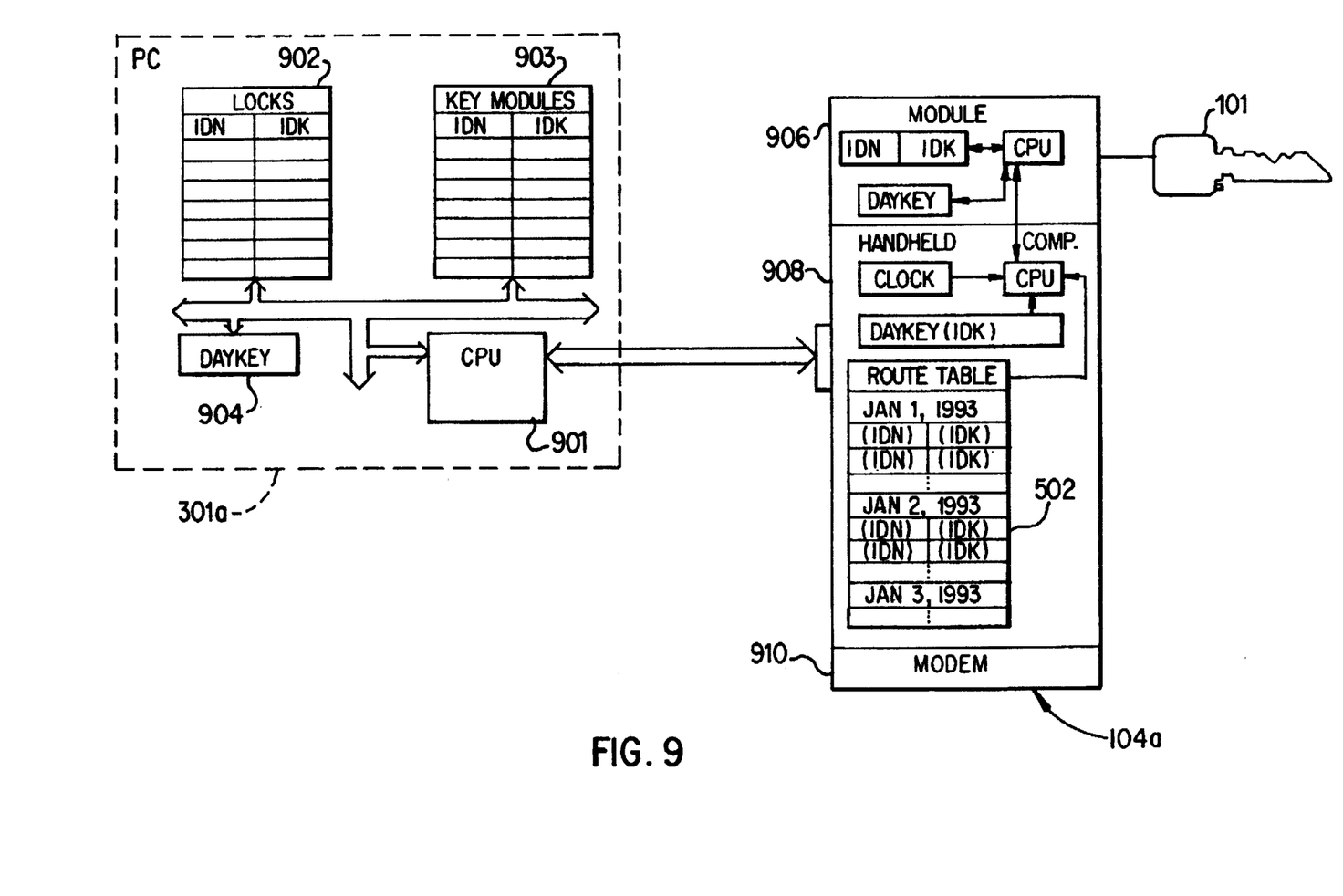
FIG. 9 is a schematic block diagram of an electronic key programmer and an electronic key unit according to a second embodiment of the present invention.

FIG. 9 illustrates a programmer 301a, which may be similar to the microcomputer programmer 301 of FIG. 3. The programmer 301a includes a CPU 901, a pair of look-up tables 902 and 903, and a daykey encrypter 904. Look-up table 902 contains a Listing of various IDNs (identification numbers) and EDKs (encryption key codes) for each lock of the system. Every lock is identified by a lock identification number or IDN, and has associated therewith a corresponding encryption key code IDK which is used by the lock to encrypt data.

Look-up table 903 contains a listing of various IDNs and IDKs for each key unit 104a of the system. Each key unit 104a is also identified by a key IDN and has associated therewith a corresponding encryption key code IDK which is used by the key unit to encrypt data.

Daykey encrypter 904 contains an arbitrary encryption key code which is changed daily in the programmer 301a (thus the designation "daykey").

Key unit 104a includes a key module 906, a handheld computer 908, and optionally a modem 910. The module 906 interfaces the handheld computer 908 to the key device 101. Handheld computer 908 is a commercially available device such as a Panasonic Model JT-770, and may be implemented by any other equivalent apparatus. The computer 908 includes a key memory 502 which stores route stop information programmed from the programmer 301a. The route stop information is organized into a route table containing specific routes labeled by date. The key interface module 906 includes the IDN and IDK for the key unit 104a.

In operation, route stops for each collector are compiled by the programmer 301a. These route stops may be selected by a management operator, or may be downloaded into the programmer 301a from a central host management system. For each key unit 104a, which is identified by a particular key module IDN and corresponding encryption key code IDK, the programmer 301a compiles a set of locks which are to be serviced for collection (or other operations) by reading out a number of IDNs and associated IDKs of the locks to be accessed by the particular key unit 104a, from the look-up table 902, to thereby generate a route table for transmission to the key unit 104a.

The IDNs and IDKs of the various locks are encrypted by the encrypter 904 using the particular daykey encryption key code in use on that day. The daykey encryption key code is then itself encrypted using the IDK encryption key code of the specific key unit 104a for which the route table is being compiled. The encrypted daykey, denoted as DAYKEY(IDK), is then also transmitted to the computer 908 of key unit 104a.

In the key unit 104a, the IDN identification number and IDK encryption key code are stored in the key interface module 906, while the encrypted daykey DAYKEY(IDK) and the encrypted route tables are stored in the key memory 502 of handheld computer 908.

Figure 11:
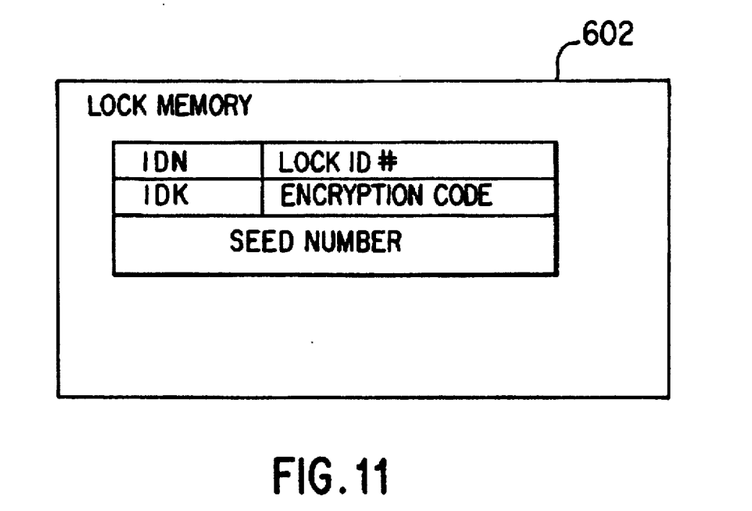
FIG. 11 is block diagram of the contents of lock memory 602 according to the second embodiment of the invention.

Referring now to FIG. 11, the lock memory 602 according to the second embodiment of the present invention contains the IDN or lock identification number of that particular lock, the IDK encryption code associated with that particular lock, and an arbitrary seed number. The seed number is simply a certain numerical value, the actual value of which is not relevant.

In order for the encrypted IDNs and IDKs of the route tables stored in memory 502 to be decrypted, the handheld computer 908 sends the encrypted daykey to the key interface module 906, which decrypts the DAYKEY(IDK) using its encryption key code IDK to obtain the decrypted daykey. The encrypted IDNs and IDKs are then sent to the module 906 to be decrypted using the daykey, and used by the module 906 in the verification process with the lock.

This feature is intended as an additional security measure to achieve an even higher level of security, for the reason that the module 906 is an add-on feature to the computer 908 and is removable therefrom. Thus, in the event that the module is lost or stolen, neither the module nor the handheld computer can be used for access to any information with respect to lock ID codes or encryption key codes. Further, since the daykey encryption code is periodically changed in the programmer, the particular daykey stored in the module 906 is of limited use.

Figure 10:
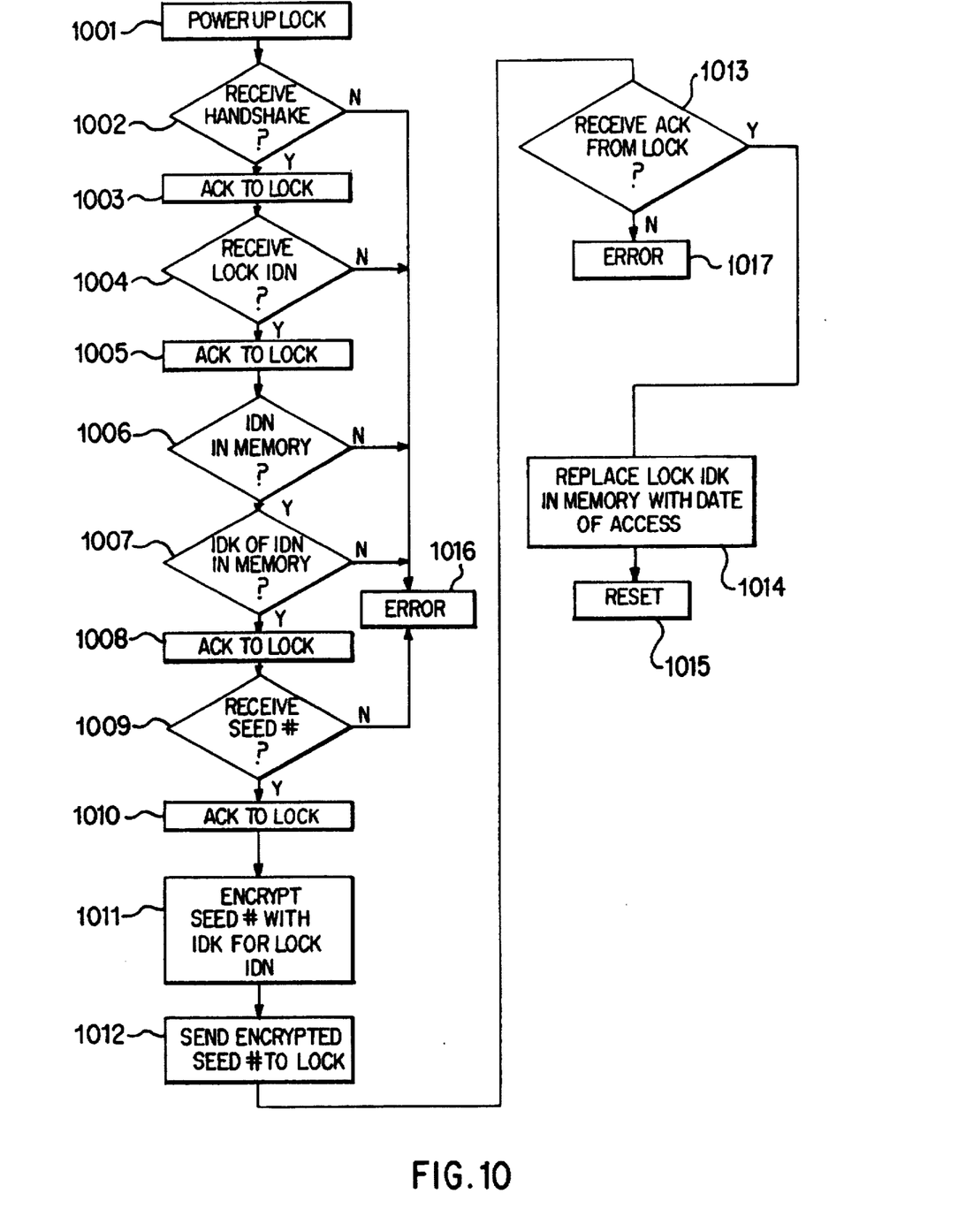
FIG. 10 is a flow chart diagram of the operation of the key unit 104a of FIG. 9.
Figure 10A:
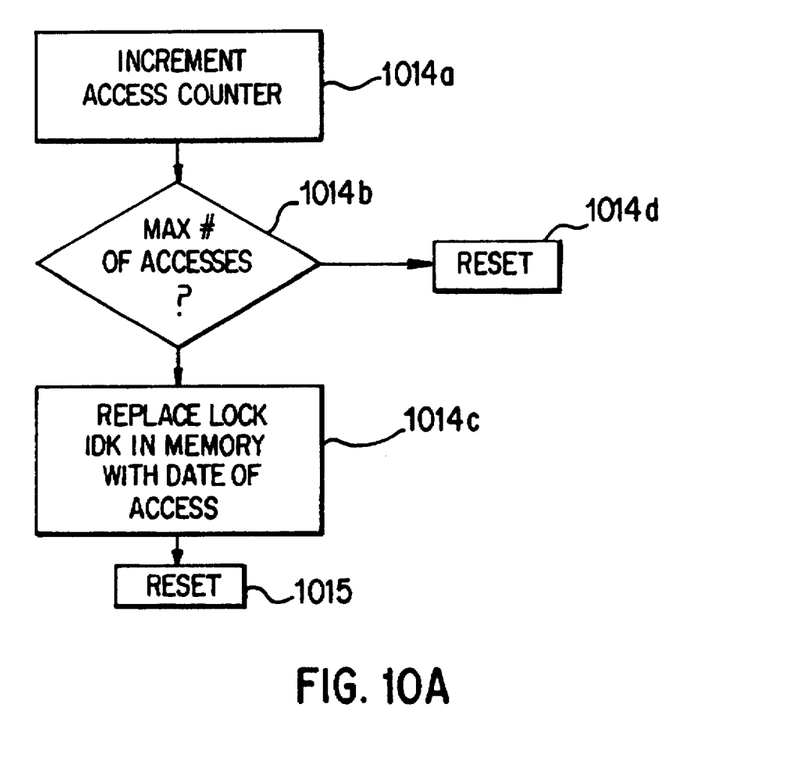
FIG. 10a is a flow chart diagram of an alternative routine for step 1014 of FIG. 10.
Figure 12:
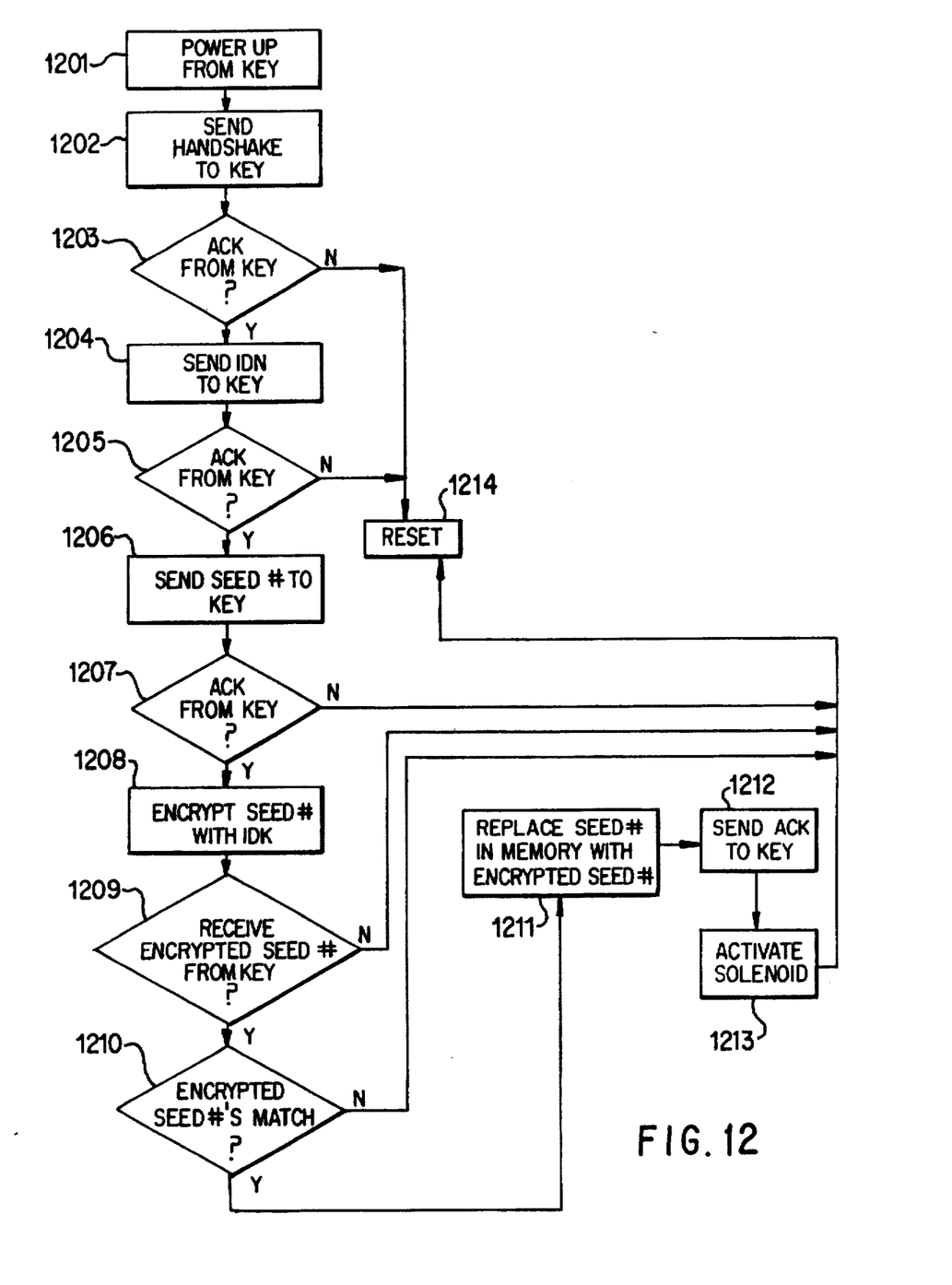
FIG. 12 is a flow chart diagram of the operation of the lock unit 201 according to the second embodiment of the invention.

Operation of the second embodiment will now be described with reference to the flow chart diagrams of FIGS. 10, 10A, and 12.

Upon insertion of the key 101 into the keyway of the lock at step 1001, power is applied to the lock at step 1201. At step 1202, the lock sends a handshake protocol to the key, which receives the handshake at step 1002 and sends an acknowledge to the lock at step 1003. At step 1203, the lock recognizes the acknowledge and sends its IDN to the key at step 1204. The key receives the lock IDN and acknowledges at steps 1004 and 1005, and checks to see whether the lock's IDN exists in memory for the presently valid route table at step 1006. As previously mentioned, the route tables are labeled by date, and the computer 908 includes a clock for keeping track of the current date.

At step 1007, if the IDN is found, the key checks to see if the lock's corresponding IDK is found in memory for the particular IDN sent by the lock and acknowledges the lock if both IDN and IDK have been found, at step 1008. Upon receiving the acknowledge at step 1205, the lock sends the seed number from memory 602 to the key at step 1206. The key acknowledges receipt of the seed number at step 1010, and the lock then encrypts the seed number with its IDK at step 1208 upon receiving the acknowledge at step 1207.

The key also encrypts the seed number from the lock at step 1011, using the IDK found for the IDN received from the lock. At step 1012, the key sends the encrypted seed number to the lock, which receives it at step 1209. The lock then compares the encrypted seed number received from the key with the encrypted seed number which the lock itself generated, at step 1210. If the numbers match, the key is determined to be authorized to access the lock. At step 1211, the key writes the encrypted seed number into the memory 602 over the old seed number. The encrypted seed number will be used as the new seed number for the next access request from a key. At step 1212, the lock sends an acknowledge to the key to inform it of a successful access request, and activates the solenoid at step 1213. The lock then resets at step 1214. If any of the acknowledges from the key are not received within a predetermined amount of time, the lock routine also advances immediately to step 1214 for reset.

Upon receiving the acknowledge from the lock at step 1013, the key unit writes the date of access into the route table at step 1014, over the IDK previously stored there. As such, the key unit will thereafter not be able to access the lock without being reprogrammed by the programmer 301a. Such can be accomplished either by bringing the key unit 104a back to the management center, or by calling into the programmer via modem 910 for reprogramming in the field.

The key unit then proceeds to step 1015 where it is reset for the next lock access attempt.

In an alternative mode of operation, the key unit may be programmed to have a set number of accesses to each lock before requiring reprogramming. Such is shown in FIG. 10A, wherein a counter is incremented at step 1014a, and the value stored in the counter is compared with a preset maximum number of accesses at step 1014b. If this number has been reached, the lock IDK is replaced by the date of access and the key unit is reset at steps 1014c and 1015;

otherwise the key unit is immediately reset at step 1014d. In either event, additional access to the lock may be denied upon an attempted access to another lock.

The invention being thus described, it will be apparent to those skilled in the art that the same may be varied in many ways without departing from the spirit and scope of the invention. Any and all such modifications are intended to be included within the scope of the following claims.

What is claimed is:

1. An electronic security system, comprising:
   a lock, including
      a lock memory storing therein an identification number of said lock, an encryption code associated with said lock, and a seed number, and
      means for encrypting said stored seed number with said encryption code to generate an encrypted seed number; key means couplable with said lock for communicating therewith, including
      a key memory storing therein a list of lock identification numbers and corresponding encryption codes,
      means for receiving said identification number of said lock and said seed number from said lock,
      means for encrypting said received seed number with an encryption code retrieved from said key code corresponding to said received identification number to generate an encrypted seed number, and
      means for transmitting said encrypted seed number to said lock; said lock further including
      means for comparing said encrypted seed number received from said key means with the encrypted seed number generated in said lock, and
      means for enabling said key means to open said lock upon determination by said means for comparing that said encrypted seed numbers match.

2. An electronic security system according to claim 1, wherein said lock further includes means for replacing said stored seed number in said lock memory with said encrypted seed number upon determination by said means for comparing that said encrypted seed numbers match.

3. An electronic security system according to claim 1, wherein said key means further includes means for deleting from said key memory the encryption code corresponding to a lock identification number of a lock which has been opened.

4. An electronic security system according to claim 3, wherein said means for deleting includes means for counting the number of accesses of said key means to a specific lock and deleting said encryption code when said number of accesses has reached a predetermined value.

5. An electronic security system according to claim 1, wherein said list of lock identification numbers and corresponding encryption codes in said key memory are encrypted with an encryption code corresponding to said key means;
   said key means further including means for decrypting said list of lock identification numbers and corresponding encryption codes with said encryption code corresponding to said key means to produce decrypted lock identification numbers and corresponding decrypted encryption codes.

6. An electronic security system according to claim 5, further comprising computer means for programming said key means with a specific route composed of a plurality of lock identification numbers and corresponding encryption codes.

7. An electronic security system according to claim 6, wherein said key memory stores a plurality of routes, each of said plurality of routes being valid only for a specific date; said key means further including means for storing the current date and for retrieving only those routes determined to be valid for said current date for comparison with lock identification numbers received from respective locks.

8. An electronic security system according to claim 6, wherein said key means further comprises a modem for communicating with said computer means over telephone lines.

9. An electronic security system according to claim 6, wherein said computer means encrypts said route with a daykey encryption code generated by said computer means, encrypts said daykey encryption code with said encryption code corresponding to said key means, and transmits said encrypted daykey encryption code with said route to said key means.

10. An electronic security system, comprising:
    a lock mechanism;
    controller means for controlling the operation of said lock mechanism, including
       means for storing a code number,
       means for modifying said stored code number according to a stored predetermined algorithm,
       means for receiving an input code number,
       means for comparing said modified code number with said input code number,
       means for enabling said lock mechanism to be operated when said input code number matches said modified code number, and
       means for replacing said stored code number with said modified code number when said input code number matches said modified code number;
    key means for operating said lock mechanism including means for storing said predetermined algorithm, means for calculating a code number according to said predetermined algorithm, means for outputting said calculated code number to said controller means as said input code number, and means for operating said lock mechanism when enabled by said controller means; and
    means for writing said predetermined algorithm into said key means corresponding to said predetermined algorithm stored in said controller means.

11. An electronic security system as set forth in claim 10, wherein said key means comprises a handheld computer and an interface module coupled to said handheld computer for interfacing said handheld computer with said lock mechanism, at least said means for outputting being located in said interface module.

12. An electronic security system as set forth in claim 10, wherein said key means further comprises mechanical key cuts for operating said lock mechanism.

13. An electronic security system as set forth in claim 10, wherein said means for writing comprises a computer.

14. An electronic security system as set forth in claim 10, wherein said controller means comprises a microprocessor.

15. An electronic security system, comprising:
    a lock, including means for unlocking said lock based on received specific data; and
    key means for operating said lock, comprising
       a handheld computer including means for storing encoded data, and
       an interface module detachably coupled to said handheld computer for interfacing said handheld computer with said lock, including means for decoding said encoded data stored in said handheld computer into decoded data and means for generating said specific data for transmission to said lock based on said decoded data.

* * * * *